UNITED STATES PATENT OFFICE.

PERCY GERALD SANFORD, OF LONDON, ENGLAND.

MODE OF PRESERVING ALBUMINOUS MATTERS.

SPECIFICATION forming part of Letters Patent No. 607,281, dated July 12, 1898.

Application filed November 19, 1897. Serial No. 659,182. (No specimens.) Patented in England May 20, 1897, No. 12,449.

*To all whom it may concern:*

Be it known that I, PERCY GERALD SANFORD, fellow of the Institute of Chemistry, analytical and consulting chemist and assayer, a subject of the Queen of Great Britain and Ireland, residing at 20 Cullum street, in the city of London, England, have invented certain improvements in the treatment of blood and other albuminous matter, both animal and vegetable, for use in manufactures and the arts, (for which I have obtained British Patent No. 12,449, dated May 20, 1897,) of which the following is a specification.

My invention has for its object to so treat blood or other albuminous matter, both animal and vegetable, that it is preserved in a condition eminently suited to render it fit for use in various manufactures and in the arts—for example, for use by calico-printers and others—and for decolorizing tanning liquors or for other purposes.

According to my invention I add to the albuminous matter to be treated ammonium fluorid or boro-fluorid of ammonium. The albuminous matter may before the addition of the said ammonium fluorid be dissolved in water, so that the solution to which the said ammonium fluorid has been added may be treated by dialysis.

In treating, for example, vegetable albumen suitable proportions are as follows: One part, by weight, of ammonium fluorid (or an equivalent quantity of boro-fluorid of ammonium) is dissolved in water at from 25° to 35° centigrade, and this is added to one hundred and fifty parts, by weight, of bran or other vegetable albuminous matter employed, and the mash is placed in a dialyzer or it is extracted under pressure. The vegetable matter so treated is then pressed and the liquor is filtered. Boracic acid may be added, this being preferably done after dialysis is complete.

When blood or equivalent animal albuminous matter is to be treated, a suitable proceeding is to take one hundred parts, by weight, of dry-blood scales, for example, or an equivalent quantity of blood-serum or defibrinated blood and rub this down in a dry mill or mortar with from twenty to thirty parts, by weight, of fluorid of ammonium or its equivalent of boro-fluorid of ammonium with or without the addition of boracic acid. To the paste so formed water is added to form an emulsion, and the whole is then placed in a dialyzer, the pan being filled with water and dialysis effected at a temperature of from 25° to 30° centigrade. When the operation is completed, the substance remaining on the diaphragm is drained off and should be of a specific gravity of from 1.022 to 1.052 or higher, and should contain, per liter, from fifty to two hundred grams of active material, (those materials which are precipitable by heat or by the action of picro-citric acid in the cold,) or the blood scales or the like may be placed upon the diaphragm of the dialyzer and a solution of fluorid, as above mentioned, be placed in the pan when the action of dialysis is much accelerated; but in this case much more extraneous matter—*i. e.*, matter precipitable by heat or picro-citric acid in the cold—enters into solution than would otherwise be the case. In using fresh blood it is well to allow it to serumise, the clotted blood being treated as hereinbefore described. The albuminous matter treated as aforesaid may be partially or wholly dried.

On account of the difficulty of obtaining a solution of a greater density than 1.030 I prefer to run off the material, which is upon the pan of the dialyzer, to a series of suitable trays or shallow troughs, wherein it can be concentrated to any desired consistency for the purpose of increasing its density, or it may be carried to dryness. In both cases the evaporation should be effected under vacuum and at as low a temperature as possible.

I claim as my invention—

The mode herein described of preserving albuminous matter, for use in the manufactures and arts, consisting in treating the same with ammonium fluorid and dialyzing the mixture, substantially as described.

In testimony whereof I have signed my name to this specification in the presence of two subscribing witnesses.

PERCY GERALD SANFORD.

Witnesses:
JAMES ARTHUR MALAUR,
HENRY DENIS HOSKINS.